Dec. 25, 1945.    M. STERN    2,391,752
METHOD FOR TREATING ALUMINUM OR ALUMINUM ALLOY SCRAP
Filed May 30, 1942
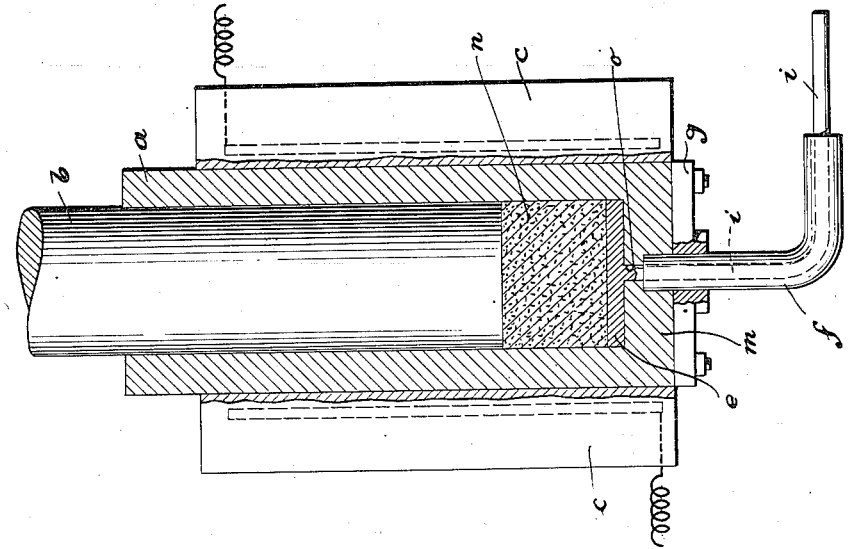
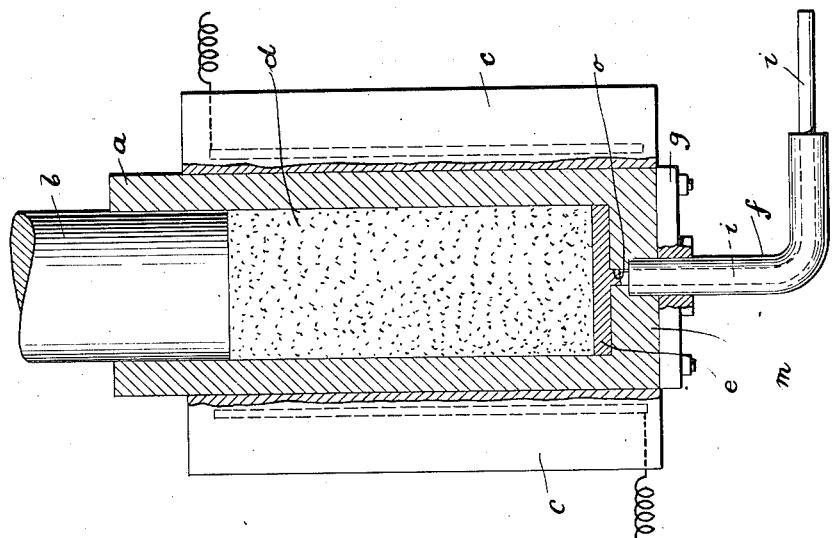
INVENTOR:
Max Stern
BY
ATTORNEY.

Patented Dec. 25, 1945

2,391,752

UNITED STATES PATENT OFFICE 2,391,752

METHOD FOR TREATING ALUMINUM OR ALUMINUM ALLOY SCRAP

Max Stern, Kew Gardens, N. Y.

Application May 30, 1942, Serial No. 445,190

3 Claims. (Cl. 207—10)

The invention relates to a method for the treatment of aluminum or aluminum alloy scrap or waste and particularly for the direct production of finished articles therefrom; it is a continuation in part of my patent application Ser. No. 356,665, which has matured into Patent No. 2,302,980.

It also relates to the direct manufacture by extrusion, pressing, rolling and similar mechanical pressure operations of tube, rods, sheets, cup-shaped bodies, structural profiles such as T-shaped, U-shaped and I-shaped profiles from aluminum or aluminum alloy turnings, borings, chippings, filings, grindings or clippings.

The utilization and compression of metal scrap and also aluminum scrap into briquettes and packets for remelting purposes is an old expedient and so is the direct manufacture of finished articles from preheated aluminum or aluminum alloy ingots.

It may therefore be understood that the present invention exclusively relates to the direct pressure conversion of aluminum scrap or waste into the finished article.

This direct conversion of aluminum borings, chippings, filings, grindings, clippings and turnings into finished articles presents severe and specific difficulties and therefore has not been attempted as yet.

Aluminum scrap and waste generally contains organic contaminating substances and water. The scrap must be completely cleaned and dried before it may be extruded or shaped by mechanical pressure methods.

If this is omitted the intersecting oil and water films will prevent a union of the scrap particles and their coalescence into homogeneous bodies.

However, the most severe difficulty in the mechanical pressure shaping of aluminum and aluminum alloy scrap and waste into finished bodies is created by the presence of oxidic films of a very tough and resistant nature which encase the individual scrap and waste particles and pieces and strongly adhere thereto.

Articles manufactured from the scrap by a method whereby these oxide skins are not disrupted and scattered or dispersed within the material under pressure have little coherence and strength because the oxide films prevent the metallic contact of the individual scrap particles and their union into uniform metallic bodies. These difficulties are not overcome by raising the pressure to an even exceedingly high rate.

This phenomenon explains why aluminum scrap and waste has up to now only been utilized by remelting which as generally known, involves heavy metal losses. Furthermore, it is known that the so-called secondary or remelted ingots cannot be extruded or rolled unless they are previously refined or mixed with virgin metal.

The severe objections to the direct manufacture of finished articles from every type of aluminum and aluminum alloy scrap and waste by mechanical pressure methods are obviated by the present invention; the latter is based upon the recognition that a temperature of at least about 300° C. must be maintained during the pressure operation in order to loosen the oxide skins which not any more supported by the softened metal, are disrupted by the pressure exerted thereupon and dispersed within the scrap under treatment thereby offering fresh metallic contact faces throughout the latter.

It therefore is the object of this invention to convert aluminum and aluminum alloy scrap and waste directly into finished articles by mechanical methods.

A further object of the invention is to avoid remelting of the scrap and the large metal losses caused thereby.

It is also an object of the invention to preserve the properties and the structure of the primary metal; as clippings, turnings and other types of scrap mainly originate from the virgin metal the scrap bodies made in accordance with the invention may be directly worked in rolling, extruding and forging apparatus.

It is another important object of the invention to recover practically the entire metal contents of the scrap as a finished article having a uniform fine grained structure and good mechanical properties.

It is a further object of the invention to loosen the oxide films enveloping the scrap and to disrupt the same and to hereby promote a metallic union of the scrap particles whereby coherent homogeneous articles are obtained which substantially have the mechanical properties and the corrosion resistance of the virgin metals.

Therefore, according to this invention, the aluminum scrap or waste is freed from contaminating organic substances and water and directly converted by extrusion or other mechanical pressure methods at a temperature of at least about 300° C. into the shape of the final article.

The most suitable pressing temperatures are between 350° and 450° C.

The adequate pressure for the production of rods, profiles and bars of customary cross section is between 18 to 40 tons per square inch; lower pressures may, however, be used for the production of articles having larger cross sections.

Several modifications of carrying out this invention are described in the following:

(1) Duralumin turnings are freed from their organic contaminations such as oil by a suitable method. Hereupon the iron is preferably separated from the scrap by a magnet.

The thus treated turnings are heated to a temperature of at least 300° C. The hot scrap is charged into an extrusion press which is provided with a heated container. The scrap is finally extruded at a temperature of between 300° to 450° C. and at a pressure of about between 18 to 40 tons per square inch into rods, tubes or structural profiles of usual cross section. The oxide films which are not more sufficiently supported by the softened metal are additionally disrupted by the pressure and forming force exerted upon the compressed scrap and a homogeneous union is effected of the scrap particles through the entirely dispersed oxide skins which remain uniformly distributed in the compressed body and do not reduce the uniformity and coherence of the same.

In this manner a finished article is produced from the aluminum scrap which in a mechanical and chemical respect is sufficiently resistant to be employed for most purposes for which a high grade aluminum or aluminum alloy is used.

(2) Aluminum borings are heated to a temperature of between 200° and 300° C., hereby freed from oil and dried.

The thus treated borings are compressed in a hydraulic press at a pressure of about 3 to 8 tons per square inch and a temperature of about 300° C. into coherent bodies; the loosened oxide skins are hereby disrupted and uniformly scattered. These bodies are charged into an extrusion press and extruded at a temperature of at least 300° C. and preferably 350° to 450° C. and at a pressure of about 18 to 40 tons per square inch into final articles.

(3) Duralumin chippings after being cleaned, freed from organic contaminations and dried are directly charged into the cylinder of an extrusion press which is heated. The scrap is compressed at a temperature of about 300° C. and a comparatively low pressure; the pressure is gradually increased to about 18 to 40 tons per square inch and the temperature raised to 350° to 450° C.; the scrap is hereby extruded into the final article.

The thus produced articles have a uniform fine-grain structure obtained by the specific working conditions of the present method; they are practically equal as far as their mechanical properties and their structure is concerned, to articles extruded or rolled from virgin metal ingots.

An extrusion die for carrying out a preferred method is shown by way of example in the attached drawing, of which Fig. 1 illustrates the operating position of the die after the hot scrap has been charged into the pressing space, and Fig. 2 illustrates its position when the extrusion commences.

The die comprises an extrusion cylinder $a$ and a piston $b$ movable in the cylinder; an aperture $o$ is provided in the bottom member $m$. The loose scrap charged into the pressing space of the die is indicated by $d$. Bottom plate $e$ end rod section $i$ which close the pressing space indicate the remnants of the article produced by a previous pressing stage.

In accordance with the operating position shown in Fig. 2 the primarily loose scrap $d$ is compressed by the downward movement of piston $b$ and converted into coherent body $n$; by continued movement of the piston $b$ and increase of the pressure to such a degree as is necessary to perform extrusion, body $n$ is extruded whereby the metal rod is formed as a finished article.

Various changes may be made to the method steps set forth in this description in connection with extrusion or other shaping methods without departing from the broader spirit and scope of the invention, as set forth in the following claims.

I claim:

1. Method of producing final articles, for instance tubes, rods and structural profiles from aluminum and aluminum alloy scrap comprising compressing the scrap by maintaining the same at a temperature of about 300° C. and at a pressure of approximately 3–8 tons per square inch, disrupting thereby the oxide skins coating the scrap particles and creating fresh metallic contact faces, thereupon increasing the temperature to about 350 to 450° C. and the pressure to about 18–40 tons per square inch and converting said bodies by maintaining these conditions directly into the final articles.

2. Method of producing final articles, for instance tubes, rods and structural profiles from aluminum and aluminum alloy scrap comprising compressing the scrap by maintaining the same at a temperature of about 300° C. and at a pressure of approximately 3–8 tons per square inch, disrupting thereby the oxide skins coating the scrap particles and creating fresh metallic contact faces, thereupon increasing the temperature to about 350 to 450° C. and the pressure to about 18–40 tons per square inch and extruding said bodies by maintaining these conditions directly into the final articles.

3. Method of producing final articles, for instance tubes, rods and structural profiles, from aluminum and aluminum alloy scrap, comprising heating the scrap to a temperature of at least 300° C., charging the heated scrap into a pressing device and shaping the same at a final pressure of about between 18 to 40 tons per square inch into the final articles.

MAX STERN.